Patented Oct. 4, 1938

2,131,992

UNITED STATES PATENT OFFICE 2,131,992

DIAZO COMPOUND AND PROCESS OF MAKING SAME

Adolf Wirz, Basel, Switzerland, assignor to the firm Society of Chemical Industry in Basle, Basel, Switzerland No Drawing. Application March 4, 1937, Serial No. 129,101. In Switzerland March 9, 1936

10 Claims. (Cl. 260—142)

This invention is based on the observation that diazonium salts of aromatic amines of the benzene and naphthalene series can be precipitated from their solutions by means of manganous salts which are derived from hydrohalic acids or by manganous salts in presence of halogen ions, with formation of compounds containing manganese. In this manner there are obtained manganiferous products which can probably be regarded as double salts of manganese and diazonium compounds, and which may be converted into valuable diazo preparations by intermixture with the usual auxiliaries, for instance sulfate of alumina, chlorobenzene disulfonic acid, naphthalene trisulfonic acid or Glaubers salt.

Among the diazo compounds which yield double compounds with the hydrogen halide salts of the bivalent manganese, there may be named quite generally diazo compounds of the benzene and naphthalene series which are precipitated by zinc chloride. The precipitations with manganous salts have however the advantage over the precipitations with zinc chloride that they yield more easily soluble double salts, so that the new method of working is particularly valuable for precipitating such diazonium salts which produce with zinc chloride such difficultly soluble precipitations that they cannot be used in practice, or only to a limited extent, for the manufacture of dyeings on the fiber. This applies for example to the diazonium salts which are derived from aminodiaryl ethers.

Analytical investigations have shown that the new products correspond very probably quite generally to the general formula

wherein R represents an aryl radical of the benzene or naphthalene series. Among these products those are particularly valuable which correspond to the general formula

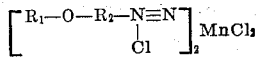

wherein $R_1$ and $R_2$ represent benzene nuclei. These products are obtained by the action of manganous chloride on the diazonium chlorides obtained by diazotizing the most various aminodiphenyl ethers. Quite particularly valuable are the products which are formed when using as diazotizing bases an aminodiphenyl ether of the general formula

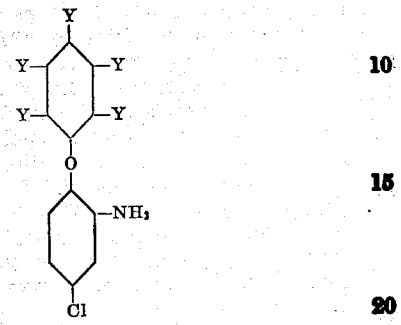

wherein four Y's stand for hydrogen and one Y is a member of the group consisting of chlorine and hydrogen.

Similar precipitations are of course also formed when using manganous bromide instead of manganous chloride, or when effecting the precipitations in the presence of salts of the hydrohalic acids.

The following examples illustrate the invention, the parts being by weight; the ratio between parts by volume and parts by weight is that which exists between the liter and the kilogram.

Example 1

88 parts of 4-chloro-2-amino-1,1'-diphenyl ether hydrochloride containing 75 per cent. of free base are well stirred together with 75 parts by volume of hydrochloric acid of 30 per cent. strength and 90 parts of ice. Into this suspension at 0–5° C. there is dropped in the course of half an hour a solution of 24 parts of sodium nitrite in 45 parts of water; when this operation is complete the whole is stirred for 15–20 minutes at 0–5° C. To the filtered diazo solution there are added whilst stirring well and in the course of 10–20 minutes 60 parts of finely powdered manganous chloride ($MnCl_2.4H_2O$) and then 35 parts of common salt, and stirring is continued for 3-4 hours at 0-5° C. to complete the reaction. The yellow double salt which has separated is filtered with suction or centrifuged and dried at 45-50° C. in a vacuum with addition of a suitable diluent (calcined Glaubers salt or aluminium sulfate). The stabilized diazo salt is very easily soluble in water and the solution is neutral. The product corresponds to the formula

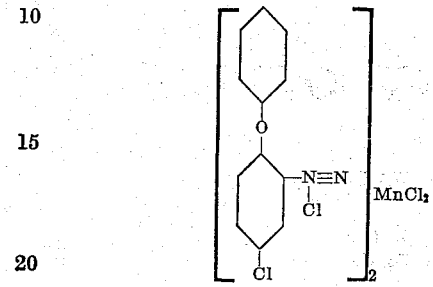

*Example 2*

92 parts of 4,4'-dichloro-2-amino-1,1'-diphenyl ether hydrochloride having a content of 82.5 per cent. of free base are well stirred together with 75 parts by volume of hydrochloric acid of 30 per cent. strength and 90 parts of ice. In the course of 30 minutes and at 0-5° C. there is run into the mixture a nitrite solution containing 24 parts of sodium nitrite and 45 parts of water; in order to complete the reaction stirring is continued for 15-20 minutes at 0-5° C. 60 parts of finely powdered manganous chloride ($MnCl_2.4H_2O$) and then 35 parts of common salt are stirred into the filtered diazo solution in the course of 10-20 minutes and stirring is continued for about 4 hours at 0-5° C. to complete the reaction. The yellow double salt this obtained is filtered with suction or centrifuged and then dried with addition of a suitable diluent at 45-50° C. in a vacuum. The double salt of manganous chloride thus obtained is very easily soluble in water, yielding a neutral solution. The product corresponds to the formula

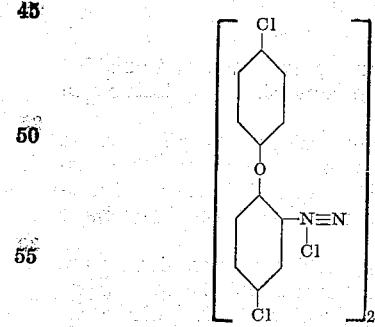

*Example 3*

87 parts of 4,2'-dichloro-2-amino-1,1'-diphenyl ether hydrochloride having a content of 87.6 per cent. of free base are well stirred together with 75 parts by volume of hydrochloric acid of 30 per cent. strength and 90 parts of ice. Into this suspension at 0-5° C. there is dropped in the course of 30 minutes a solution of 24 parts of sodium nitrite in 45 parts of water. Stirring is continued for 15-20 minutes. Into the filtered diazo solution there are introduced whilst stirring well 60 parts of manganous chloride ($MnCl_2.4H_2O$) and then 35 parts of common salt, and stirring is continued for 3-4 hours at 0-5° C. in order to complete the reaction. The diazo salt which has separated is filtered with suction or centrifuged and dried at 45-50° C. in a vacuum with addition of a suitable diluent. This diazo preparation from 4,2'-dichloro-2-amino-1,1'-diphenyl ether and manganous chloride is very easily soluble in water to a neutral solution. The product corresponds to the formula

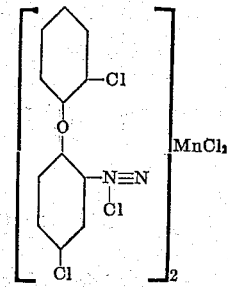

As pointed out explicitly in the introduction, the process can also be carried out with other diazo salts, for example other aminodiphenyl ethers, or products which belong to quite different series, for example simple diazo compounds, such as those of the α-naphthylamine or the β-naphthylamine, the 1-amino-4-benzoylamino-2,5-diethoxybenzene or 2,5-dimethoxybenzene, or still more complicated diazo compounds, such as those from 4-amino-1,1'-azobenzene, 4-amino-2',3-dimethyl-1,1'-azobenzene, 4-amino-3-methoxy-1,1'-azobenzene, 1-aminonaphthalene-4-(2'-methoxy- or 2'-ethoxy)-azobenzene, and the like.

What I claim is:

1. Process for the manufacture of diazo salts, comprising treating diazonium compounds of the general formula

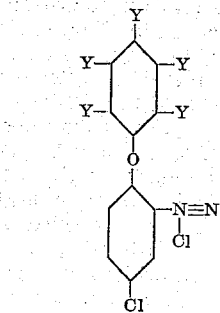

wherein four Y's stand for hydrogen and one Y stands for a member of the group consisting of hydrogen and chlorine, with manganous chloride.

2. Process for the manufacture of a diazo salt, comprising precipitating diazotized 4-chloro-2-amino-1,1'-diphenyl ether with manganous chloride.

3. Process for the manufacture of a diazo salt, comprising precipitating diazotized 4,4'-dichloro-2-amino-1,1'-diphenyl ether with manganous chloride.

4. Process for the manufacture of a diazo salt, comprising precipitating diazotized 4,2'-dichloro-2-amino-1,1'-diphenyl ether with manganous chloride.

5. The double salts from manganous halides and diazo compounds of the group consisting of diazonium halides of the benzene and naphthalene series.

6. The diazonium salts of the general formula

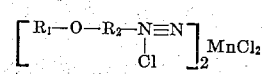

wherein $R_1$ and $R_2$ represent benzene radicals.

7. The diazonium salts of the general formula
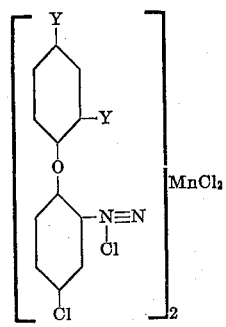
in which Y stands for a member of the group consisting of hydrogen and chlorine, and in which not more than one Y represents chlorine.
8. The diazonium salts of the formula
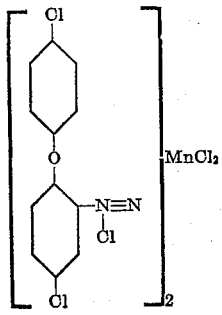
9. The diazonium salts of the formula
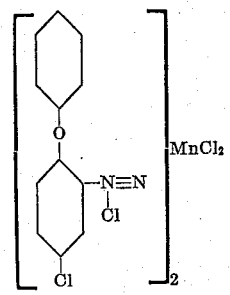
10. The diazonium salts of the formula
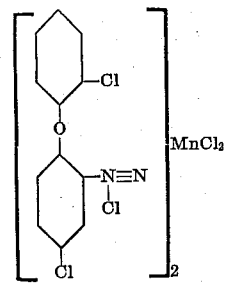
ADOLF WIRZ.